UNITED STATES PATENT OFFICE.

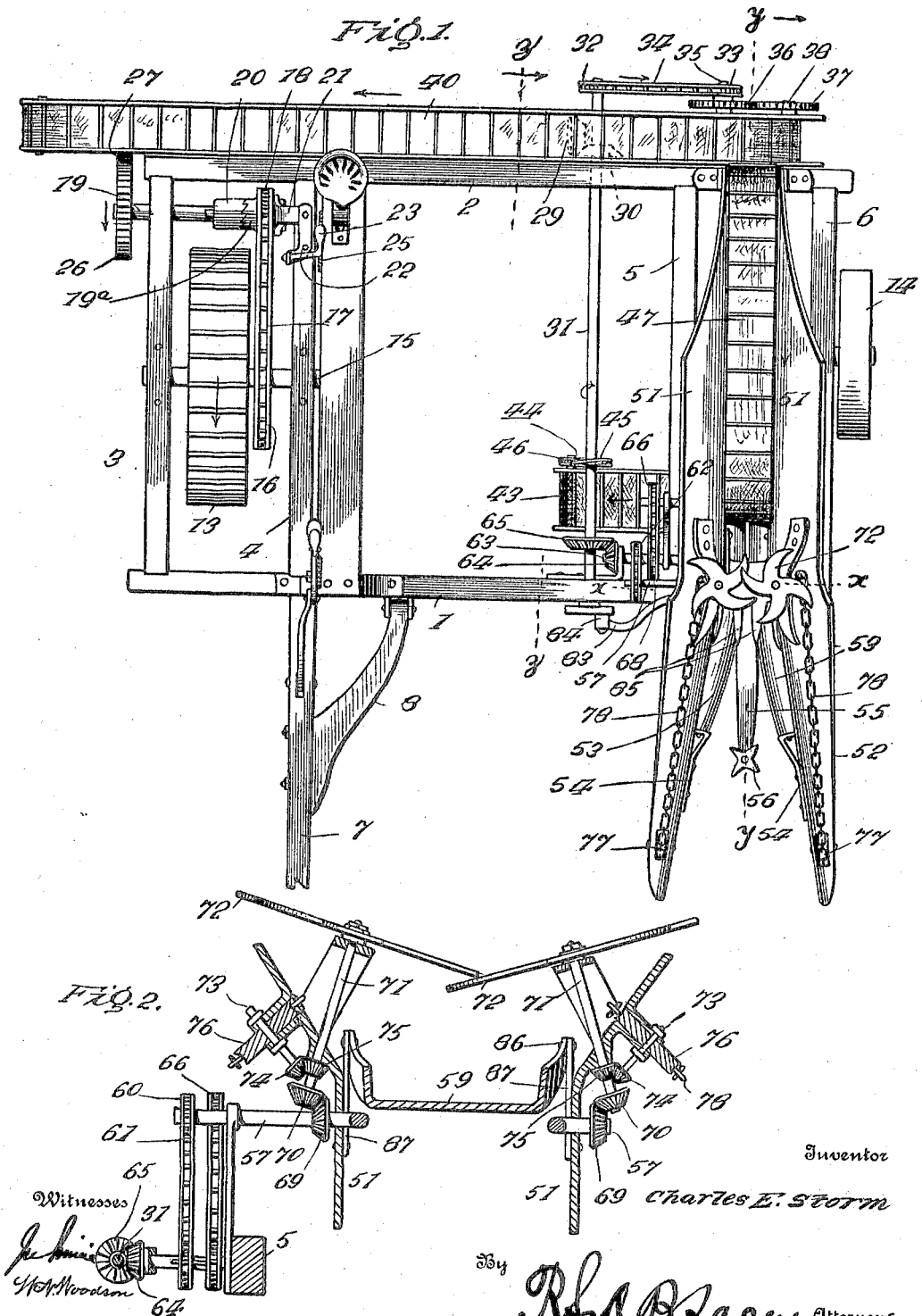

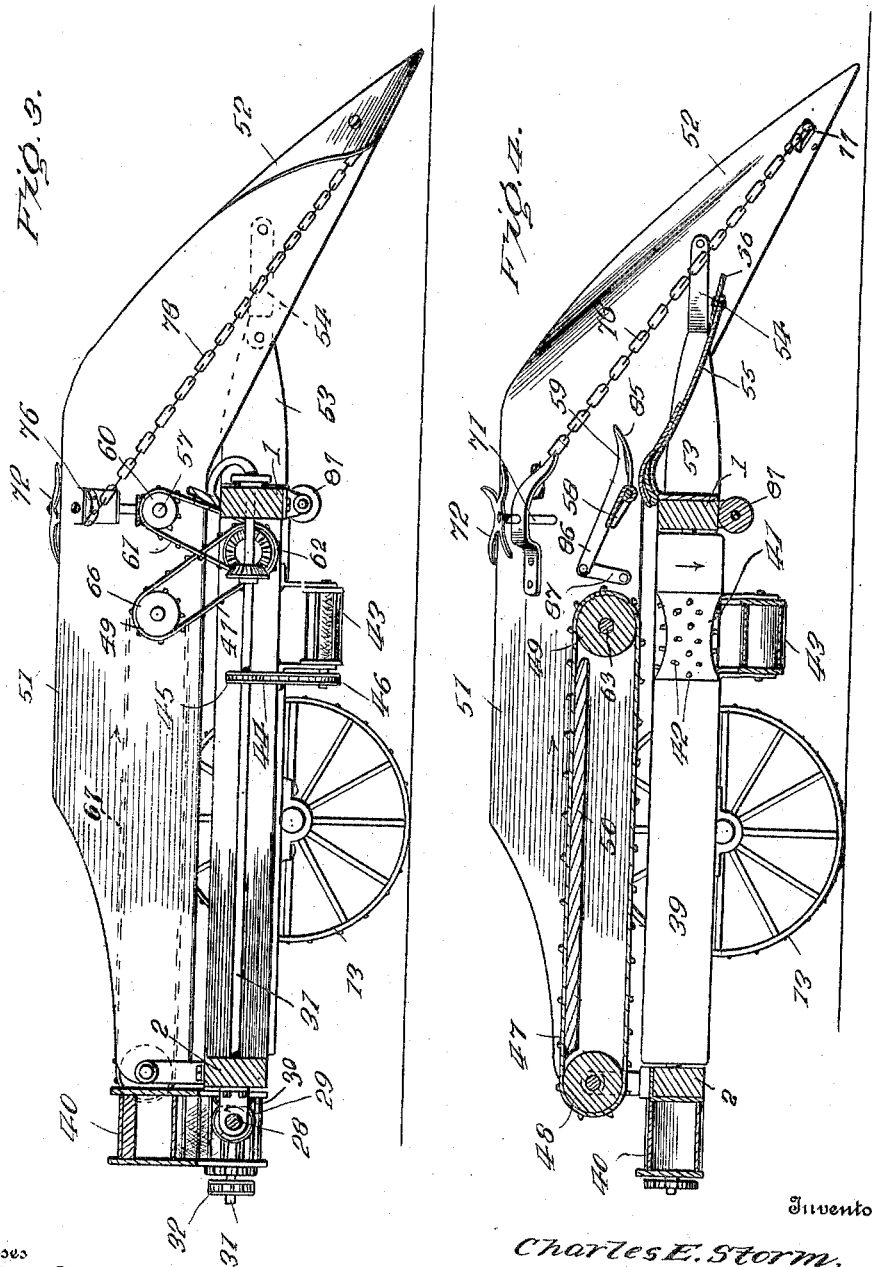

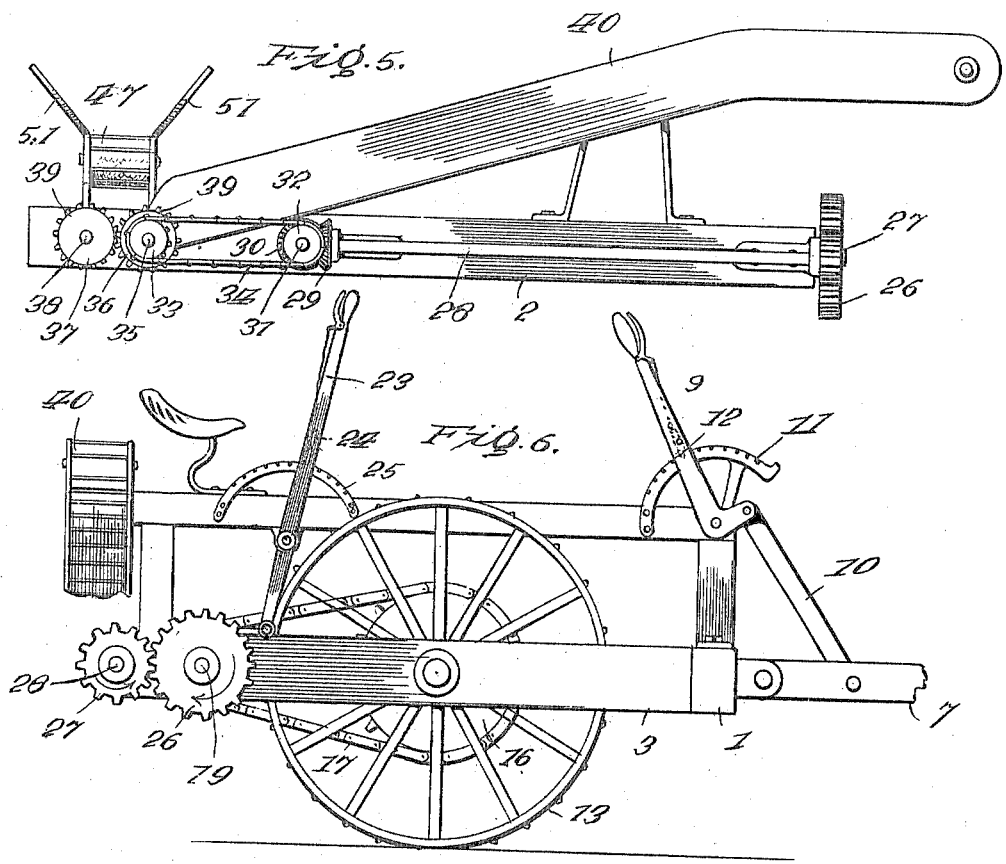
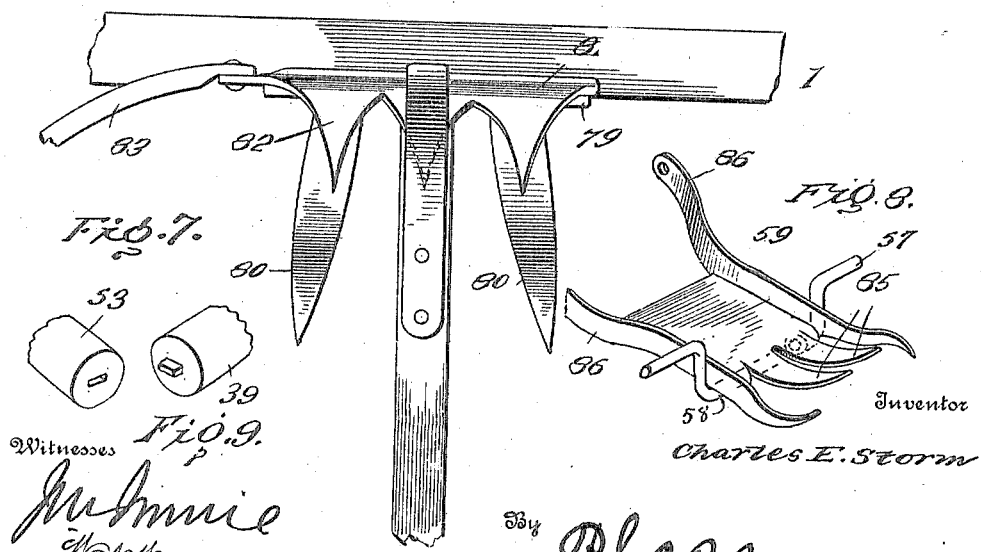

CHARLES E. STORM, OF TROWBRIDGE, ILLINOIS.

CORN-HARVESTING MACHINE.

No. 817,200.	Specification of Letters Patent.	Patented April 10, 1906.

Application filed April 12, 1905. Serial No. 255,191.

*To all whom it may concern:*

Be it known that I, CHARLES E. STORM, a citizen of the United States, residing at Trowbridge, in the county of Shelby and State of Illinois, have invented certain new and useful Improvements in Corn-Harvesting Machines, of which the following is a specification.

This invention relates to harvesting-machines, and most especially to such as designed for stripping ears of corn from the stalks in the field and removing the husks from the ears in one continuous operation, the purpose being to provide an improved general structure and such adjunctive parts as will add materially to the efficiency and desirability of the machine as a whole.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a plan view of a corn-harvester embodying the invention. Fig. 2 is a transverse section of the mechanism for stripping the ears from the stalks, taken on the line $x\ x$ of Fig. 1, showing the parts on a larger scale. Fig. 3 is a longitudinal section of the machine on the line $z\ z$ of Fig. 1 looking in the direction of the arrows. Fig. 4 is a longitudinal section on the line $y\ y$ of Fig. 1. Fig. 5 is a rear view of the machine. Fig. 6 is a side view of the machine opposite to that provided with the stripping and husking mechanisms. Fig. 7 is a detail view of the cutting mechanism on a larger scale. Fig. 8 is a detail perspective view of the stripper, showing the supporting and operating shaft therefor. Fig. 9 is a detail perspective view of the opposing end portions of a guide-roller and a husking-roller, the parts being separated to show more clearly the loose joint between them.

Corresponding and like parts are referred to in the following description and indicated in all the views of the drawings by the same reference characters.

The framework is of ordinary construction, such as commonly provided in agricultural machinery designed for operation in the field and comprises a front bar 1, rear bar 2, and longitudinal bars 3, 4, 5, and 6, the several bars being firmly connected at their points of contact. The pole or tongue 7 is pivotally connected to the transverse bar 1 and is braced by a stay 8 and is adjustable at its upper end, which is moved by means of an operating-lever 9 and link 10 and held in the required position by means of a toothed bar 11 and latch 12. The framework is supported upon two wheels 13 and 14, the former constituting the driver and mounted upon axle 15 in the usual manner. A sprocket-wheel 16, fast to the axle 15, is connected by sprocket-chain 17 to pinion 18, loose upon shaft 19, journaled in the bars 3 and 4, parallel with the axle 15. A clutch member $19^a$ is formed with the pinion 18 and is adapted to coöperate with a clutch member 20, fast to the shaft 19. This clutch $19^a$ 20 may be operated in any manner by suitable means to throw the operating mechanism into and out of gear. For this purpose a shipper 21 is employed and is connected by lever 22 with a hand-lever 23, adapted to be held in an adjusted position by any means, such as toothed bar 25.

A gear-wheel 26 is fast to the projecting end of the shaft 19 and is in mesh with a pinion 27, fast to one end of a transverse shaft 28, located in the rear of the transverse bar 2. The transverse shaft 28 is provided at its inner end with a bevel-gear 29, which meshes with a companion bevel-gear 30 of a longitudinal shaft 31, which shaft is provided at its rear end with a sprocket-wheel 32, having a connection with a sprocket-wheel 33 by means of a sprocket-chain 34, the sprocket-wheel 33 being fast to a shaft 35, paralleling the shaft 31. A spur-gear 36, fast to the shaft 35, is in mesh with a companion spur-gear 37 of a shaft 38, arranged parallel with the shaft 35. The shafts 35 and 38 are longitudinally placed, and each is provided with a roller 39, which serves to remove the husks from the ears and to support the latter in their passage to the rear elevator or carrier 40, by means of which the ears are delivered into a wagon traveling alongside of the harvester. The husking-rollers 39 are spaced apart a short distance and are operated so as to cause their inner portions to move downward at a like speed, whereby the husks caught therebetween are forcibly removed from the ears. One husking-roller has a portion 41 near its front end made concave or slightly hollow and studded with teeth 42, which bite into the husks and start the same from the ears, the space formed by the hollow or concave portions 41 accommodating the teeth 42 and at the same time providing for escape of the bulk of the husk and the stub snapped from the butt of the ear.

A transverse conveyer 43 is arranged near the front of the machine and directly below the hollow or concave portions of the husking rollers and receives any shelled corn or kernels that may be detached from the ears during the preliminary operation of stripping the ears from the stalks and starting the husks from the ears. The carrier 43 is driven from the longitudinal shaft 31 by means of a belt 44 and coöperating pulleys 45 and 46, the latter being fast to a projecting end of the journal of the roller supporting the delivery end of said carrier 43 and the pulley 45 being fast to the shaft 31.

A feeder 47 is arranged with the space formed between the husking-rollers and moves the ears thereover, so as to effect delivery thereof upon the rear elevator or carrier 40. The feeder 47 consists of an endless belt supported at its end upon rollers 48 and 49 and having its upper portion sustained by means of a plate or board 50. The endless belt is provided with a series of transverse lags or flights to make positive engagement with the ears to effect their movement along the husking-rollers. The lower or active portion of the endless belt 47 travels rearward, so as to move the ears toward the elevator or carrier 40. Side pieces 51 embrace opposite sides of the feeder or endless belt 47, and their upper longitudinal edge portions flare to form a trough, so as to catch any ears that may be tossed upward by the stripper. Guards 52 incline forwardly and downwardly and flare upwardly and outwardly, so as to catch the stalks and direct them into the machine, so as to effect the desired work. The guards 52 form, in effect, a continuation of the side pieces 51 and may be an integral part thereof. The cutting and stripping mechanisms are arranged at the inner end of the space formed between the guards 52 and about in line with the front ends of the husking-rollers. Guide-rollers 53 are arranged at the inner lower ends of the guards 52, and their shafts are loosely connected in any manner with the respective shafts 35 and 38, so as to rotate therewith. As shown, the end of each of the shafts 35 and 38 is extended and flattened or made angular and loosely fitted in an opening in the inner end of each guide-roller, Fig. 9. The guide-rollers 53 taper throughout their length and are arranged with their smaller ends to the front. Brackets 54, attached to the guards 52, support the front ends of the guide-rollers, and their forward extensions incline toward the plane of the guards 52, so as to direct stalks past the ends of the guide-rollers 53 and prevent their lodging thereon. A tongue 55 extends forward between the guards and guide-rollers and is centrally disposed with reference thereto and is provided at its front end with a star-wheel 56, the points of which direct the stalks to one side or the other of the tongue. The tongue 55 is longitudinally tapered, and a space is formed at each side thereof between the tongue and each of the guide-rollers 53, through which the stalks pass on their way to the cutting and stripping mechanisms. The tongue 55 is curved and is resilient, so as to yield vertically, whereby the harvesting of the ears is greatly facilitated and the operating mechanisms prevented from being overstrained.

A transverse shaft 57 is arranged about at the juncture of the guards 52 and side pieces 51 and is provided with the crank portion 58, upon which is mounted a stripper 59. The inner end of the shaft 57 is provided with a sprocket-wheel 60, having connection by means of a sprocket-chain 61 with sprocket-wheel 62 on a transverse shaft 63, which in turn has fast thereto a bevel-gear 64 in mesh with a companion bevel-gear 65, fast on shaft 31. The carrier 47 derives motion from the shaft 63 by means of sprocket-wheel 66, fast to the shaft or journal of the roller 49 and sprocket-chain 67, the latter passing around sprocket-wheel 66 and around a companion sprocket-wheel 68, fast to the shaft 63. The shaft 57 is provided with bevel-gears 69 at the outer side of each side guard, and these bevel-gears are in mesh with companion bevel-gears 70, fast to shafts 71, having their upper end portions projected through openings in the forward ends of the side pieces 51 and provided at their upper ends with reels 72, whose arms curve. Other shafts 73, arranged at an angle to the shafts 71 and about parallel with the flared portions of the side pieces 51, are geared at their lower ends to the shafts 57 by means of bevel-gearing 74 and 75. Sprocket-wheels 76 are fast to the shafts 73 and have a portion projected beyond the inner sides of the guards 51 and 52. Guide-sprockets 77 are mounted at the front ends of the guards 52 and in conjunction with the sprocket-wheels 76 support chains 78, provided with teeth to engage with the stalks and positively move them through the space formed between the guards 52.

The cutting mechanism located at the inner end of the space formed between the guards 52 comprises a fixed plate 79, having curved fingers 80 projected forward therefrom. A reciprocating cutter 81 is arranged above the plate 79 and fingers 80 and is provided with cutter-teeth 82, conforming to the fingers 80, so as to fit close thereagainst, and operated by a shear action. A pitman 83 connects the reciprocating cutter 81 with a crank 84 at the front end of the shaft 31.

The stripper 59 is of scoop form and is provided at its front end with a series of fingers 85 and at its rear end with arms 86, the latter being connected, by means of links 87, with the lower portion of the side pieces 51. In operation the stripper receives a forward, upward, and rearward movement, the stalks passing between the fingers 85, which latter engaging with the ears snap or strip the latter from the stalks and toss them upward upon the top portion of the carrier 47, which moves said ears forward and strips them upon the husking-rollers and then carries said ears rearward upon the husking-rollers toward the elevator or carrier 40.

The elevator or carrier 40 may be of any desired construction capable of receiving the ears from the husking-rollers and delivering them into a wagon or other receptacle at one side of the machine. The endless belt or like moving part of the elevator 40 preferably derives its motion from a roller fast to the shaft 38.

A harvester constructed substantially as herein set forth and embodying the salient features of the invention is adapted to be advanced over the field by any suitable propelling means and in the present instance by having a team hitched to the pole or tongue 7. In the forward movement of the machine the working parts derive motion from the drive-wheel 13 and axle 15 through the instrumentalities and power-translating means substantially as disclosed. The stalks passing between the guards 52 are engaged by the teeth-chains 78 and are moved rearward, the ears being either snapped or cut therefrom, according as acted upon by the stripper 59 or the cutting mechanism. The ears thus separated from the stalks are received upon the forward ends of the husking-rollers, whose teeth 42 positively clip the husks and begin the tearing of the same from the ears. Any kernels that may become detached by the action of the pins 42 pass through the space formed by the concave portions 41 and drop upon the carrier 43. The husks started by the pins 42 and drawn forward between the husking-rollers are pulled from the ears as the latter pass over the husking-rollers and the elevator or carrier 40. The ears divested of their covering are received upon the elevator 40 and delivered thereby into the wagon or receptacle at one side of the machine provided for this purpose.

A roller 87 is journaled in bearings attached to and pendent from the bar 1 opposite to the cutting and stripping mechanisms to enable the stalks to readily clear the machine during its progress and the action of the said cutting and stripping mechanisms.

Having thus described the invention, what is claimed as new is—

1. In a corn-harvester, the combination of side guards for directing the stalks to the husking mechanism, guide-rollers arranged at the inner end of the space formed between said guards, and brackets attached to said guards and supporting the forward ends of the guide-rollers and each having a portion inclined forward toward its guard to prevent lodging of the stalks upon the front ends of the guide-rollers.

2. In a corn-harvester and in combination with the husking and ear-detaching mechanisms, side guards, and a tongue arranged between said side guards and adapted to have a yielding vertical movement.

3. In a corn-harvester and in combination with the husking and ear-detaching mechanisms, side guards, a tongue arranged between said side guards, and a star-wheel mounted upon the front end of said tongue to direct the stalks into the space formed at either side of said tongue.

4. In a corn-harvester and in combination with the husking mechanism and means for directing the stalks thereto, a cutting mechanism comprising a fixed plate having fingers extended forward therefrom and curved in their length from a horizontal plane and a reciprocating cutter having teeth conforming to and coöperating with the said forward-extended and longitudinally-curved fingers.

5. In a corn-harvester, the combination of means for stripping the ears from the stalks, spaced side guards for directing the stalks to said ear-stripping means, and a tongue arranged between the said side guards and adapted to have a yielding vertical movement.

6. In a corn-harvester, the combination of husking and ear-detaching mechanisms, the latter including a stripper element, side guards, a transverse shaft 57 having a crank portion between its ends connected to the said stripper element, other shafts 71 and 73 arranged at an angle and geared to each other, the shaft 71 being geared to the shaft 57, reels attached to the shafts 71, and toothed chains coöperating with the guards and deriving motion from the shafts 73.

In testimony whereof I affix my signature in presence of two witnesses.

CHARLES E. STORM. [L. S.]

Witnesses:
   J. B. LATCH,
   OLIVER SHEFFLER.